(12) United States Patent
Wu

(10) Patent No.: US 9,954,596 B2
(45) Date of Patent: Apr. 24, 2018

(54) INTERFERENCE REJECTION COMBINING METHOD, DEVICE AND STORAGE MEDIUM

(71) Applicant: Sanechips Technology Co.,Ltd., Shenzhen, Guangdon (CN)

(72) Inventor: Gang Wu, Shenzhen (CN)

(73) Assignee: Sanechips Technology Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 15/551,075

(22) PCT Filed: Dec. 29, 2015

(86) PCT No.: PCT/CN2015/099430
§ 371 (c)(1),
(2) Date: Aug. 15, 2017

(87) PCT Pub. No.: WO2016/131342
PCT Pub. Date: Aug. 25, 2016

(65) Prior Publication Data
US 2018/0034532 A1 Feb. 1, 2018

(30) Foreign Application Priority Data
Feb. 16, 2015 (CN) .......................... 2015 1 0085527

(51) Int. Cl.
*H04B 7/08* (2006.01)
*H04L 25/02* (2006.01)
(Continued)

(52) U.S. Cl.
CPC ....... *H04B 7/0854* (2013.01); *H04L 25/0228* (2013.01); *H04L 25/0244* (2013.01);
(Continued)

(58) Field of Classification Search
CPC ........................... H04B 7/0954; H04B 7/0456
(Continued)

(56) References Cited

U.S. PATENT DOCUMENTS

2009/0296863 A1 12/2009 Tirkkonen
2010/0303182 A1* 12/2010 Daneshrad ........... H04B 1/7102
375/346
(Continued)

FOREIGN PATENT DOCUMENTS

CN 101330358 A 12/2008
CN 101902306 A 12/2010
(Continued)

OTHER PUBLICATIONS

International Search Report in international application No. PCT/CN2015/099430, dated Feb. 1, 2016, 2 pgs.
(Continued)

*Primary Examiner* — Kevin Kim
(74) *Attorney, Agent, or Firm* — Cooper Legal Group, LLC

(57) ABSTRACT

Disclosed in an embodiment of the disclosure is an interference rejection combining (IRC) method supporting transmit diversity, in which an N*N interference and noise covariance matrix corresponding to one subcarrier is generated from signals, in a transmit diversity mode, received at cell reference signal (CRS) resource positions via N receiving antennas, where N is greater than or equal to 3; Cholescy decomposition and upper triangular matrix inversion is performed on the N*N interference and noise covariance matrix to obtain an N*N block matrix; the N*N block matrix is expanded to a 2N*2N noise whitening matrix; and the received signals and channel estimation values are whitened according to the noise whitening matrix, and the whitened received signals and channel estimation values used to
(Continued)

obtain a minimum mean square error-IRC (MMSE-IRC) processing result. Also disclosed are an IRC device supporting the transmit diversity, and a computer storage medium.

18 Claims, 6 Drawing Sheets

(51) Int. Cl.
  H04L 27/26 (2006.01)
  H04L 25/03 (2006.01)
(52) U.S. Cl.
  CPC .... H04L 25/0246 (2013.01); H04L 25/03993 (2013.01); H04L 27/2647 (2013.01)
(58) Field of Classification Search
  USPC .................................. 375/299, 347, 346, 267
  See application file for complete search history.

(56) References Cited

U.S. PATENT DOCUMENTS

2012/0243502 A1  9/2012  Lindqvist
2013/0089040 A1  4/2013  Tabet

FOREIGN PATENT DOCUMENTS

CN  102932290 A  2/2013
CN  103986562 A  8/2014
CN  104683282 A  6/2015
WO  2011071426 A1  6/2011

OTHER PUBLICATIONS

English Translation of the Written Opinion of the International Search Authority in international application No. PCT/CN2015/099430, dated Feb. 1, 2016, 5 pgs.

"Enhanced performance requirement for LTE User Equipment (UE)", (Release 11) Mar. 2012, 3GPP TR 36 829, 3rd Generation Partnership Project; Technical Specification Group Radio Access Network, 83 pgs.

"Investigation on Interference Rejection Combining Receiver for Space—Frequency Block Code Transmit Diversity in LTE-Advanced Downlink", Jan. 2014, Yusuke Ohwatari, Nobuhiko Miki Yuta Sagae and Yukihiko Okumura, IEEE Transactions on Vehicular Technologies, vol. 63, No. 1, pp. 191-203.

Supplementary European Search Report in European application No. 15882481.3, dated Jan. 22, 2018, 14 pgs.

"Interference Rejection Combining in LTE Networks", Jun. 2012, Yann Leost, Moussa Abdi, Robert Richter and Michael Jeschke, Bell Labs Technical Journal, Wiley, CA, US, vol. 17, No. 1, pp. 25-49.

\* cited by examiner

US 9,954,596 B2

INTERFERENCE REJECTION COMBINING METHOD, DEVICE AND STORAGE MEDIUM

TECHNICAL FIELD

The disclosure relates to wireless communications, and more particularly, to an interference rejection combining (IRC) method and device supporting transmit diversity and a storage medium.

BACKGROUND

In downlink transmission of a 3GPP LTE-advanced (LTE-A) system, both a physical downlink control channel (PDCCH) and a physical downlink shared channel (PDSCH) are configured a transmission mode of transmit diversity. With such wireless transmission channels, the system may obtain a diversity gain to improve the receiving performance.

For the LTE-A system, a main processing flowchart of the transmit diversity in a physical layer is shown in FIG. 1. Information bits are encoded by an encoder to form codewords, then the codewords are sequentially subjected to scrambling and modulation mappers to form transmitting symbols, and then the transmitting symbols are sequentially subjected to a layer mapper and precoding, a transmission mode may be configured via the precoding into a transmit diversity mode; and at last, after resource mapping and orthogonal frequency division multiplexing (OFDM), modulated signals are sent out from a plurality of transmitting antenna ports.

Accordingly, a processing flowchart at a receiving end is shown in FIG. 2. Received signals are sequentially subjected to OFDM demodulation, resource demapping, channel estimation, processing of a transmit diversity processing unit, layer demapping, demodulation and decoding; and at last, the information bits are output.

In the LTE-A, particularly for the sake of supporting a complex interference environment in a heterogeneous network in a version Release 11, an IRC technology is generally adopted by a receiver so as to cope with strong interference of neighboring cells. A conventional method is the minimum mean square error-IRC (MMSE-IRC) stated in a technical report of the 3GPP. However, to support multiple input multiple output (MIMO) transmission on more than two layers in the LTE-A, up to 4 receiving antennas may be provided. In this case, according to the conventional MMSE-IRC processing, the IRC needs to perform inversion of an 8-8 matrix, and thus the processing of the receiver is very complicated.

SUMMARY

Some embodiments of the disclosure are intended to provide an IRC method and device supporting transmit diversity, so as to at least partially reduce the complexity of interference rejection.

The technical schemes of the embodiment of the disclosure are implemented as follows.

An embodiment of the disclosure provides an IRC method supporting transmit diversity, which includes:

an N*N interference and noise covariance matrix corresponding to one subcarrier is generated from signals, in a transmit diversity mode, received at cell reference signal (CRS) resource positions via N receiving antennas, where N is greater than or equal to 3;

Cholescy decomposition and upper triangular matrix inversion is performed on the N*N interference and noise covariance matrix to obtain an N*N block matrix; the N*N block matrix is expanded to a 2N*2N noise whitening matrix; and the received signals and channel estimation values are whitened according to the noise whitening matrix, and the whitened received signals and channel estimation values used to obtain a minimum mean square error-IRC (MMSE-IRC) processing result.

Based on the above schemes, said generating an N*N interference and noise covariance matrix corresponding to one subcarrier from signals, in a transmit diversity mode, received at CRS resource positions via N receiving antennas includes:

a product of the corresponding channel estimation values and CRS symbols is subtracted from the signals, in the transmit diversity mode, received at CRS resource positions via N receiving antennas, and self-correlation is performed on signals obtained by the subtracting to generate the N*N interference and noise covariance matrix corresponding to the one subcarrier.

Based on the above schemes, the Cholescy decomposition and the upper triangular matrix inversion are performed in parallel.

Based on the above schemes, said expanding the N*N block matrix to the 2N*2N noise whitening matrix includes:

the 2N*2N noise whitening matrix is formed by using the N*N block matrix and conjugates of the N*N block matrix, wherein main diagonal elements of the formed 2N*2N noise whitening matrix are the N*N block matrix and the conjugates of the N*N block matrix, and off-diagonal elements of the formed 2N*2N noise whitening matrix are zero.

Based on the above schemes, said whitening the received signals and the channel estimation values according to the noise whitening matrix includes:

the received signals are whitened into $\tilde{Y}=UY$ and the channel estimation values are whitened into $\tilde{H}=UG$, according to the noise whitening matrix U, wherein the Y represents the received signals, and the H represents a matrix of the channel estimation values.

An embodiment of the disclosure provides an IRC device supporting transmit diversity, which includes: a generation module, a first obtaining module, a whitening module and a second obtaining module, the generation module is arranged to generate an N*N interference and noise covariance matrix corresponding to one subcarrier from signals, in a transmit diversity mode, received at cell reference signal (CRS) resource positions via N receiving antennas, where N is greater than or equal to 3;

the first obtaining module is arranged to perform Cholescy decomposition and upper triangular matrix inversion on the N*N interference and noise covariance matrix to obtain an N*N block matrix, and expand the N*N block matrix to a 2N*2N noise whitening matrix;

the whitening module is arranged to whiten the received signals and channel estimation values according to the noise whitening matrix; and the second obtaining module is arranged to use the whitened received signals and channel estimation values to obtain a minimum mean square error-IRC (MMSE-IRC) processing result.

Based on the above schemes, the generation module may be arranged to subtract, from the signals, in the transmit diversity mode, received at CRS resource positions via N receiving antennas, a product of the corresponding channel estimation values and CRS symbols, and perform self-correlation on signals obtained by the subtracting to generate the N*N interference and noise covariance matrix corresponding to the one subcarrier.

Based on the above schemes, the first obtaining module may be arranged to perform the Cholescy decomposition and the upper triangular matrix inversion on the N*N interference and noise covariance matrix in parallel to obtain the N*N block matrix.

Based on the above schemes, the first obtaining module may be arranged to form the 2N*2N noise whitening matrix by using the N*N block matrix and conjugates of the N*N block matrix, wherein main diagonal elements of the formed 2N*2N noise whitening matrix are the N*N block matrix and the conjugates of the N*N block matrix, and off-diagonal elements of the formed 2N*2N noise whitening matrix are zero.

An embodiment of the disclosure provides a receiver, which includes the IRC device of the disclosure.

An embodiment of the disclosure provides a computer storage medium storing computer executable instructions, which are arranged to execute at least one of the above methods.

According to the IRC method and device supporting the transmit diversity and the computer storage medium provided by the embodiments of the disclosure, an N*N interference and noise covariance matrix corresponding to one subcarrier is generated from signals, in a transmit diversity mode, received at cell reference signal (CRS) resource positions via N receiving antennas, where N is greater than or equal to 3; Cholescy decomposition and upper triangular matrix inversion is performed on the N*N interference and noise covariance matrix to obtain an N*N block matrix; the N*N block matrix is expanded to a 2N*2N noise whitening matrix; and the received signals and channel estimation values are whitened according to the noise whitening matrix, and the whitened received signals and channel estimation values used to obtain a minimum mean square error-IRC (MMSE-IRC) processing result. In this way, the IRC complexity is reduced, and the operating speed of hardware may be improved.

DETAILED DESCRIPTION

Figure 1:
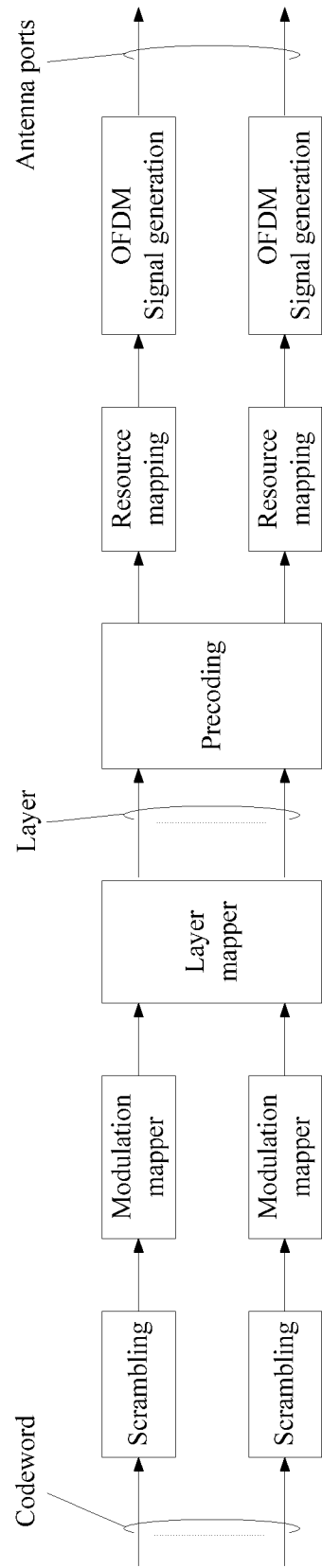
FIG. 1 is a main processing flowchart of transmit diversity in a physical layer in an LTE-A system.
Figure 2:
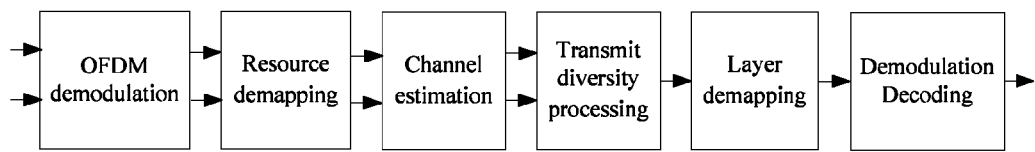
FIG. 2 is a processing flowchart at a receiving end.

It is assumed that a transmitting signal on a $2i^{th}$ subcarrier is $x_0$, a transmitting signals on a $2i+1^{th}$ subcarrier is $x_1$, the i is a serial number of a subcarrier at any PDSCH data position, the a matrix of the channel estimation values is H, the interference of neighboring cells is I, the noise is N, four receiving antennas are provided and transmitting signals of any two adjacent subcarriers are X, received signals Y of the any two adjacent subcarriers are:

$$Y = \begin{bmatrix} r_0(2i) \\ r_1(2i) \\ r_2(2i) \\ r_3(2i) \\ r_0^*(2i+1) \\ r_1^*(2i+1) \\ r_2^*(2i+1) \\ r_3^*(2i+1) \end{bmatrix} = \tag{1}$$

$$HX + I + N = \frac{1}{\sqrt{2}} \begin{bmatrix} h_{00}(2i) & -h_{01}(2i) \\ h_{10}(2i) & -h_{11}(2i) \\ h_{20}(2i) & -h_{21}(2i) \\ h_{30}(2i) & -h_{31}(2i) \\ h_{01}^*(2i+1) & -h_{00}^*(2i+1) \\ h_{11}^*(2i+1) & -h_{10}^*(2i+1) \\ h_{21}^*(2i+1) & -h_{20}^*(2i+1) \\ h_{31}^*(2i+1) & -h_{30}^*(2i+1) \end{bmatrix} \begin{bmatrix} x_0 \\ x_1^* \end{bmatrix} + I + N$$

For the IRC processing of the transmit diversity, the conventional MMSE-IRC is implemented as follows:

$$\tilde{X} = H^H(H^HH+R)^{-1}Y = (H^HR^{-1}H+I)H^HR^{-1}Y \tag{2}$$

where R is a covariance matrix for the interference and the noise, and a formula of the R should be:

$$R = \tilde{r}\tilde{r}^* = \begin{bmatrix} \tilde{r}(2i)\tilde{r}^*(2i) & \tilde{r}(2i)\tilde{r}(2i+1) \\ \tilde{r}^*(2i+1)\tilde{r}^*(2i) & \tilde{r}^*(2i+1)\tilde{r}(2i+1) \end{bmatrix} = \begin{bmatrix} R_{00} & R_{01} \\ R_{10} & R_{11} \end{bmatrix} \tag{3}$$

where $$\psi = Y - HX$$

$$R_{00} = \begin{bmatrix} \tilde{r}_0(2i)\tilde{r}_0^*(2i) & \tilde{r}_0(2i)\tilde{r}_1^*(2i) & \tilde{r}_0(2i)\tilde{r}_2^*(2i) & \tilde{r}_0(2i)\tilde{r}_3^*(2i) \\ \tilde{r}_1(2i)\tilde{r}_0^*(2i) & \tilde{r}_1(2i)\tilde{r}_1^*(2i) & \tilde{r}_1(2i)\tilde{r}_2^*(2i) & \tilde{r}_1(2i)\tilde{r}_3^*(2i) \\ \tilde{r}_2(2i)\tilde{r}_0^*(2i) & \tilde{r}_2(2i)\tilde{r}_1^*(2i) & \tilde{r}_2(2i)\tilde{r}_2^*(2i) & \tilde{r}_2(2i)\tilde{r}_3^*(2i) \\ \tilde{r}_3(2i)\tilde{r}_0^*(2i) & \tilde{r}_3(2i)\tilde{r}_1^*(2i) & \tilde{r}_3(2i)\tilde{r}_2^*(2i) & \tilde{r}_3(2i)\tilde{r}_3^*(2i) \end{bmatrix}$$

-continued $$R_{01} = \begin{bmatrix} \tilde{r}_0(2i)\tilde{r}_0(2i+1) & \tilde{r}_0(2i)\tilde{r}_1(2i+1) & \tilde{r}_0(2i)\tilde{\gamma}_2(2i+1) & \tilde{r}_0(2i)\tilde{r}_3(2i+1) \\ \tilde{r}_1(2i)\tilde{r}_0(2i+1) & \tilde{r}_1(2i)\tilde{r}_1(2i+1) & \tilde{r}_1(2i)\tilde{\gamma}_2(2i+1) & \tilde{r}_1(2i)\tilde{r}_3(2i+1) \\ \tilde{r}_2(2i)\tilde{r}_0(2i+1) & \tilde{r}_2(2i)\tilde{r}_1(2i+1) & \tilde{r}_2(2i)\tilde{\gamma}_2(2i+1) & \tilde{r}_2(2i)\tilde{r}_3(2i+1) \\ \tilde{r}_3(2i)\tilde{r}_0(2i+1) & \tilde{r}_3(2i)\tilde{r}_1(2i+1) & \tilde{r}_3(2i)\tilde{\gamma}_2(2i+1) & \tilde{r}_3(2i)\tilde{r}_3(2i+1) \end{bmatrix}$$

$$R_{10} = \begin{bmatrix} \tilde{r}_0^*(2i+1)\tilde{r}_0^*(2i) & \tilde{r}_0^*(2i+1)\tilde{r}_1^*(2i) & \tilde{r}_0^*(2i+1)\tilde{r}_2^*(2i) & \tilde{r}_0^*(2i+1)\tilde{r}_3^*(2i) \\ \tilde{r}_1^*(2i+1)\tilde{r}_0^*(2i) & \tilde{r}_1^*(2i+1)\tilde{r}_1^*(2i) & \tilde{r}_1^*(2i+1)\tilde{r}_2^*(2i) & \tilde{r}_1^*(2i+1)\tilde{r}_3^*(2i) \\ \tilde{r}_2^*(2i+1)\tilde{r}_0^*(2i) & \tilde{r}_2^*(2i+1)\tilde{r}_1^*(2i) & \tilde{r}_2^*(2i+1)\tilde{r}_2^*(2i) & \tilde{r}_2^*(2i+1)\tilde{r}_3^*(2i) \\ \tilde{r}_3^*(2i+1)\tilde{r}_0^*(2i) & \tilde{r}_3^*(2i+1)\tilde{r}_1^*(2i) & \tilde{r}_3^*(2i+1)\tilde{r}_2^*(2i) & \tilde{r}_3^*(2i+1)\tilde{r}_3^*(2i) \end{bmatrix}$$

$$R_{11} = \begin{bmatrix} \tilde{r}_0^*(2i+1)\tilde{r}_0(2i+1) & \tilde{r}_0^*(2i+1)\tilde{r}_1(2i+1) & \tilde{r}_0^*(2i+1)\tilde{r}_2(2i+1) & \tilde{r}_0^*(2i+1)\tilde{r}_3(2i+1) \\ \tilde{r}_1^*(2i+1)\tilde{r}_0(2i+1) & \tilde{r}_1^*(2i+1)\tilde{r}_1(2i+1) & \tilde{r}_1^*(2i+1)\tilde{r}_2(2i+1) & \tilde{r}_1^*(2i+1)\tilde{r}_3(2i+1) \\ \tilde{r}_2^*(2i+1)\tilde{r}_0(2i+1) & \tilde{r}_2^*(2i+1)\tilde{r}_1(2i+1) & \tilde{r}_2^*(2i+1)\tilde{r}_2(2i+1) & \tilde{r}_2^*(2i+1)\tilde{r}_3(2i+1) \\ \tilde{r}_3^*(2i+1)\tilde{r}_0(2i+1) & \tilde{r}_3^*(2i+1)\tilde{r}_1(2i+1) & \tilde{r}_3^*(2i+1)\tilde{r}_2(2i+1) & \tilde{r}_3^*(2i+1)\tilde{r}_3(2i+1) \end{bmatrix}$$

In this way, the MMSE-IRC in the formula (2) needs to perform inversion on an 8*8 matrix, and thus the computation complexity is large. Moreover, if there is strong interference from the neighboring cells at the PDSCH data position, the covariance matrix R for the interference and the noise generally cannot be obtained by means of data demodulation.

Therefore, if approximate equivalence processing is performed on elements in $R_{00}$ and $R_{11}$, i.e., $R_{00}=R_{11}^*$, solving the covariance matrix R for the interference and the noise may be simplified to solving by means of calculating the $R_{00}$. The $R_{00}$ may be obtained according to the input CRS. It is assumed that the received signal Y(k) at a CRS position k∈CRS is:

$$Y(k) = H_0(k)s_0(k) + I + N = \begin{bmatrix} h_{00}(k) \\ h_{10}(k) \\ h_{20}(k) \\ h_{30}(k) \end{bmatrix} s_0 + I + N \quad (4)$$

The $R_{00}$ is obtained by subtracting local cell signals at all CRS resource positions of each resource block (RB) and then averaging:

$$\tilde{r}(k) = \begin{bmatrix} \tilde{r}_0(k) \\ \tilde{r}_1(k) \\ \tilde{r}_2(k) \\ \tilde{r}_3(k) \end{bmatrix} = Y(k) - H_0(k)s_0(k) \quad (5)$$

$$R_{00} = \frac{1}{N_{sp}} \sum_{k \in CRS} \tilde{r}(k)\tilde{r}^H(k) = $$

$$\frac{1}{N_{sp}} \sum_{k \in CRS} \begin{bmatrix} \tilde{r}_0(k)\tilde{r}_0^*(k) & \tilde{r}_0(k)\tilde{r}_1^*(k) & \tilde{r}_0(k)\tilde{r}_2^*(k) & \tilde{r}_0(k)\tilde{r}_3^*(k) \\ \tilde{r}_1(k)\tilde{r}_0^*(k) & \tilde{r}_1(k)\tilde{r}_1^*(k) & \tilde{r}_1(k)\tilde{r}_2^*(k) & \tilde{r}_1(k)\tilde{r}_3^*(k) \\ \tilde{r}_2(k)\tilde{r}_0^*(k) & \tilde{r}_2(k)\tilde{r}_1^*(k) & \tilde{r}_2(k)\tilde{r}_2^*(k) & \tilde{r}_2(k)\tilde{r}_3^*(k) \\ \tilde{r}_3(k)\tilde{r}_0^*(k) & \tilde{r}_3(k)\tilde{r}_1^*(k) & \tilde{r}_3(k)\tilde{r}_2^*(k) & \tilde{r}_3(k)\tilde{r}_3^*(k) \end{bmatrix} \quad (6)$$

where $N_{sp}$ is the number of samples of all CRS ports in one RB, for example, there are sixteen samples for two ports (port0, port1).

In this way, $$R = \begin{bmatrix} R_{00} & 0 \\ 0 & R_{00}^* \end{bmatrix},$$

then, by performing the Cholescy decomposition on the R, the Cholescy decomposition on the $R_{00}$ may be finished:

$$chol(R) = \begin{bmatrix} chol(R_{00}) & 0 \\ 0 & chol(R_{00}^*) \end{bmatrix} = \begin{bmatrix} V_{00}^H V_{00} & 0 \\ 0 & (V_{00}^*)^H V_{00}^* \end{bmatrix} = V^H V \quad (7)$$

where $$V = \begin{bmatrix} V_{00} & 0 \\ 0 & V_{00}^* \end{bmatrix},$$

which is still an upper triangular matrix. By performing the inversion on the upper triangular matrix, a noise whitening matrix U is obtained:

$$U = (V)^{-H} = \begin{bmatrix} V_{00}^H & 0 \\ 0 & V_{00}^{-1} \end{bmatrix} = \begin{bmatrix} U_{00} & 0 \\ 0 & U_{00}^* \end{bmatrix} \quad (8)$$

It is assumed that $$R_{00} = \begin{bmatrix} r_{00} & r_{01} & r_{02} & r_{03} \\ r_{10} & r_{11} & r_{12} & r_{13} \\ r_{20} & r_{21} & r_{22} & r_{23} \\ r_{30} & r_{31} & r_{32} & r_{33} \end{bmatrix}, V_{00} = \begin{bmatrix} v_{00} & v_{01} & v_{02} & v_{03} \\ 0 & v_{11} & v_{12} & v_{13} \\ 0 & 0 & v_{22} & v_{23} \\ 0 & 0 & 0 & v_{33} \end{bmatrix},$$

$$U_{00} = \begin{bmatrix} u_{00} & 0 & 0 & 0 \\ u_{10} & u_{11} & 0 & 0 \\ u_{20} & u_{21} & u_{22} & 0 \\ u_{30} & u_{31} & u_{32} & u_{33} \end{bmatrix}$$

In the process of performing the Cholescy decomposition and the upper triangular matrix inversion, the following algorithm is adopted:

Cholescy Decomposition:

$$v_{ii} = \sqrt{r_{ii} - \sum_{k=0}^{i-1} v'_{ki} v_{ki}}, i = 0, \ldots, 3 \qquad (9)$$

$$v_{ij} = \frac{1}{v_{ii}} \left( r_{ij} - \sum_{k=0}^{i-1} v'_{ki} v_{kj} \right), i < j \qquad (10)$$

Upper Triangular Matrix Inversion:

$$u_{ii} = \frac{1}{v_{ii}}, i = 0, \ldots, 3 \qquad (11)$$

$$u_{ji} = \left( -u_{ii} \sum_{k=j}^{i-1} u'_{kj} v_{ki} \right)^*, i > j \qquad (12)$$

For i=0, . . . , 3, calculation of each column may be performed in sequence as follows:

$v_{00}$, $u_{00}$, $(v_{01}, v_{02}, v_{03})$, $v_{11}$, $u_{11}$, $(v_{12}, v_{13}, u_{10})$, $v_{22}$, $u_{22}$, $(v_{23}, u_{21}, u_{20})$, $v_{33}$, $u_{33}$, $(u_{33}, v_{31}, u_{30})$ each item in brackets may be calculated in parallel. Moreover, the calculation steps to find an inverse $$\frac{1}{v_{ii}}$$

in (10) and (11) may be used repeatedly, such that it is avoidable to first perform the Cholescy decomposition and then perform the upper triangular matrix inversion. Since $$u_{ii} = \frac{1}{v_{ii}}$$

may be used repeatedly, with a processing step $(u_{32}, v_{31}, u_{30})$ in addition to the Cholescy decomposition, the operations of the Cholescy decomposition and the upper triangular matrix inversion may be finished.

According to the formula (7) and the formula (8), by transforming the formula (2), it may obtain:

$$\tilde{X} = (H^H R^{-1} H + I) H^H R^{-1} Y = [H^H (V^H * V)^{-1} H + I] H^H)$$
$$V^H * V)^{-1} Y = (H^H U^H U H + I) H^H U^H U Y = (\tilde{H}^H \tilde{H} + I)$$
$$\tilde{H}^H \tilde{Y} \qquad (10)$$

where the received signals are whitened into $\tilde{Y} = UY$ and the channel estimation values are whitened into $\tilde{H} = UH$.

It may be seen from the above deduction that the noise whitened matrix U may be obtained by performing the Cholescy decomposition and the upper triangular matrix inversion on the $R_{00}$, and at last, the MMSE-IRC processing result may be obtained by using the noise whitened matrix U to whiten the received signals and the channel estimation value.

In the embodiment of the disclosure, an N*N interference and noise covariance matrix corresponding to one subcarrier is generated from received signals at CRS resource positions via N (N>=3) receiving antennas in the transmit diversity mode; Cholescy decomposition and upper triangular matrix inversion are performed on the N*N interference and noise covariance matrix to obtain a N*N block matrix; the N*N block matrix is expanded to a 2N*2N noise whitening matrix; and the received signals and channel estimation values are whitened according to the noise whitening matrix, and the whitened received signals and channel estimation values are used to obtain an MMSE-IRC processing result.

The disclosure will be further described in detail below in conjunction with accompanying drawings and specific embodiments. It is to be noted that the exemplary embodiments are merely for describing and illustrating the disclosure, but not intended to limit the disclosure.

Figure 3:
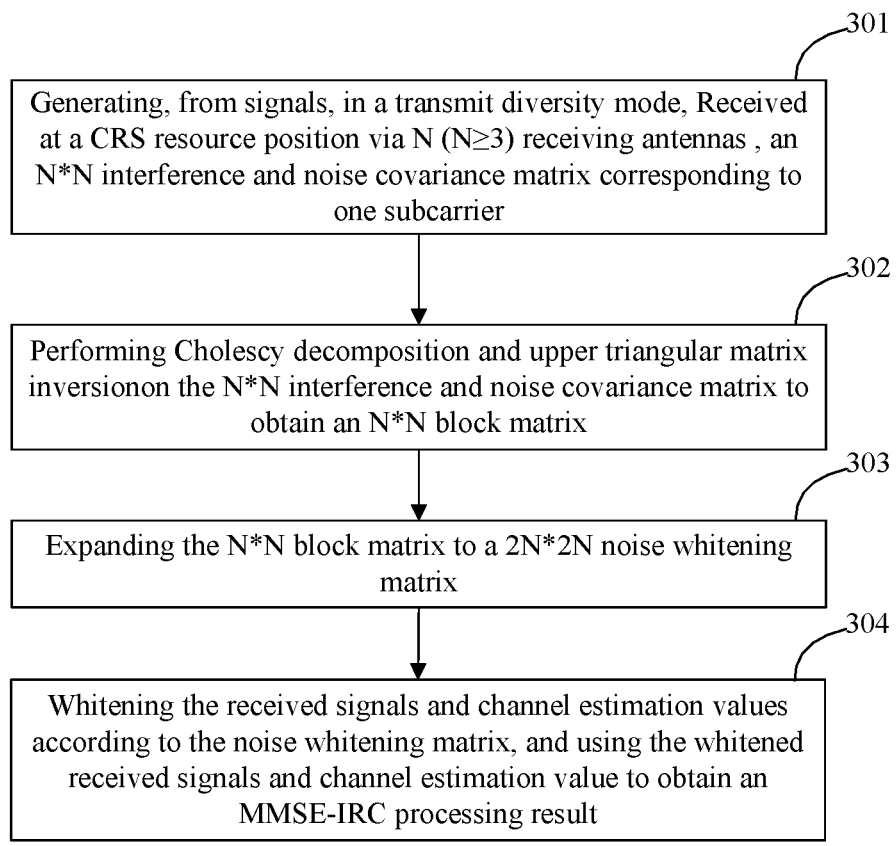
FIG. 3 is a flowchart of an IRC method supporting transmit diversity provided by an embodiment of the disclosure.
Figure 4:
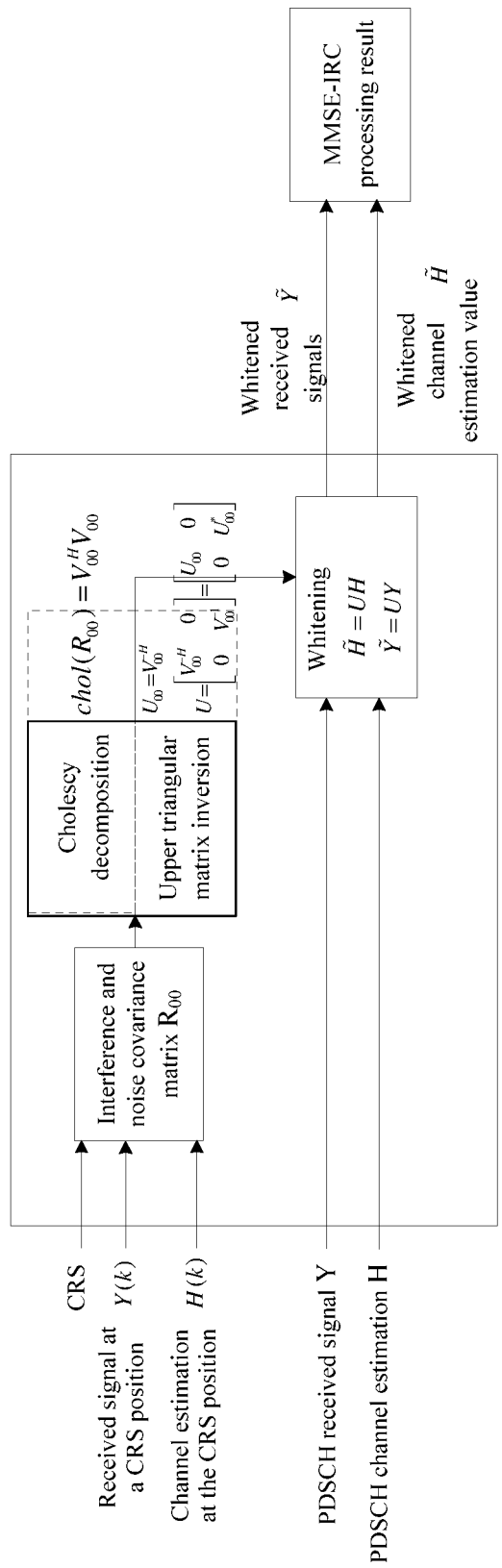
FIG. 4 is a principle diagram of an IRC method supporting transmit diversity provided by an embodiment of the disclosure.

According to the embodiment of the disclosure, an IRC method supporting transmit diversity is implemented. As shown in FIG. 3 and FIG. 4, the method includes the following steps.

In step 301, an N*N interference and noise covariance matrix corresponding to one subcarrier is generated from signals, in the transmit diversity mode, received at CRS resource positions via N (N>=3) receiving antennas.

Optionally, the N*N interference and noise covariance matrix corresponding to the one subcarrier is generated by subtracting a product of the corresponding channel estimation values and CRS symbols from the signals, in the transmit diversity mode, received at the CRS resource position via the N (N>=3) receiving antennas, and performing self-correlation on obtained signals.

In this step, the CRS resource positions may be obtained by receiving CRSs.

In step 302, Cholescy decomposition and upper triangular matrix inversion re performed on the N*N interference and noise covariance matrix to obtain an N*N block matrix.

Specifically, the Cholescy decomposition is performed on the $R_{00}$:

$$\text{chol}(R_{00}) = V_{00}^H V_{00} \qquad (11)$$

By performing the inversion on the $V_{00}$, the block matrix $U_{00}$ is obtained:

$$U_{00} = V_{00}^{-H} \qquad (12)$$

In this step, the Cholescy decomposition and the upper triangular matrix inversion are performed in parallel.

In step 303, the N*N block matrix is expanded to a 2N*2N noise whitening matrix.

Specifically, the N*N block matrix and conjugates of the N*N block matrix are formed into the 2N*2N noise whitening matrix, where main diagonal elements are the N*N block matrix and the conjugates of the N*N block matrix, and off-diagonal elements are zero.

The noise whitening matrix U is:

$$U = \begin{bmatrix} V_{00}^{-H} & 0 \\ 0 & V_{00}^{-1} \end{bmatrix} = \begin{bmatrix} U_{00} & 0 \\ 0 & U_{00}^* \end{bmatrix} \qquad (13)$$

In step 304, the received signals and channel estimation values are whitened according to the noise whitening matrix, and the whitened received signals and channel estimation values are used to obtain an MMSE-IRC processing result.

For example, the received signals are whitened into $\tilde{Y} = UY$ and the channel estimation values are whitened into $\tilde{H} = UH$ according to the noise whitening matrix U, where the Y represents the received signals, the H represents a matrix of the channel estimation values, and the MMSE-IRC processing result is obtained according to an formula $\tilde{X} = (\tilde{H}^H \tilde{H} + I) \tilde{H}^H \tilde{Y}$.

The step herein further includes: the MMSE-IRC processing result is output to an interface or a subsequent demodulation module or device.

The method of the disclosure as described above generally may be executed by a receiver.

Figure 5:
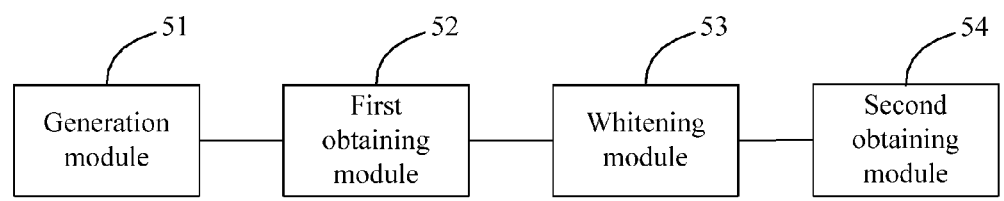
FIG. 5 is a structure diagram of an IRC device supporting transmit diversity provided by an embodiment of the disclosure.

To implement the above method, the embodiment of the disclosure further provides an IRC device supporting transmit diversity. As shown in FIG. 5, the device includes: a generation module 51, a first obtaining module 52, a whitening module 53 and a second obtaining module 54.

The generation module 51 is arranged to generate an N*N interference and noise covariance matrix corresponding to one subcarrier from signals, in a transmit diversity mode, received at cell reference signal (CRS) resource positions via N receiving antennas, where N is greater than or equal to 3.

The first obtaining module 52 is arranged to perform Cholescy decomposition and upper triangular matrix inversion on the N*N interference and noise covariance matrix to obtain an N*N block matrix, and expand the N*N block matrix to a 2N*2N noise whitening matrix.

The whitening module 53 is arranged to whiten the received signals and channel estimation values according to the noise whitening matrix.

The second obtaining module 54 is arranged to use the whitened received signals and channel estimation values to obtain an MMSE-IRC processing result.

Here, the generation module 51 is arranged to subtract, from the signals, in the transmit diversity mode, received at the CRS resource positions via the N (N>=3) receiving antennas, a product of the corresponding channel estimation values and CRS symbols, and perform self-correlation on obtained signals to generate the N*N interference and noise covariance matrix corresponding to the one subcarrier.

The first obtaining module 52 is arranged to perform the Cholescy decomposition and upper triangular matrix inversion on the N*N interference and noise covariance matrix in parallel to obtain the N*N block matrix.

The first obtaining module 52 is arranged to form the 2N*2N noise whitening matrix by using the N*N block matrix and conjugates of the N*N block matrix, wherein main diagonal elements of the formed 2N*2N noise whitening matrix are the N*N block matrix and the conjugates of the N*N block matrix, and off-diagonal elements of the formed 2N*2N noise whitening matrix are zero.

The whitening module 53 is arranged to whiten, according to the noise whitening matrix U, the received signals into $\tilde{Y}=UY$ and the channel estimation values into $\tilde{H}=UH$, where the Y represents the received signals, and the H represents a matrix of the channel estimation values.

The second obtaining module 55 is arranged to obtain the MMSE-IRC processing result according to an formula $\tilde{X}=(\tilde{H}^H\tilde{H}+I)\tilde{H}^H\tilde{Y}$, where I is interference from neighboring cells.

In an actual application, functions of the generation module 51, the first obtaining module 52, the whitening module 53 and the second obtaining module 54 may be implemented by a central processor unit (CPU), or a microprocessor unit (MPU), or a digital signal processor (DSP), or a programmable gate array (FPGA) in the receiver.

Based on the above device, an embodiment of the disclosure further provides a receiver including the above device.

Hereinafter, the advantages of the invention will be described by a simulation of the receiver in the LTE-A system (Release 11). Specific simulation conditions may refer to test cases for transmit diversity in a 3GPP standard [3]: 8.2.1.2.4-1: transmit diversity performance (FRC) with TM3 interference model. And main parameters are as follows: bandwidth: 10M; channel: EVA70; transmission mode of a main cell: TM2, MCS=6, cell ID=0; transmission mode of two interference cells: TM3; interference cells at 80% probability: Rank1; 20% probability: Rank2, cell ID=1/2; and SINR at a 70% throughput place: −1.4 dB.

Figure 6:
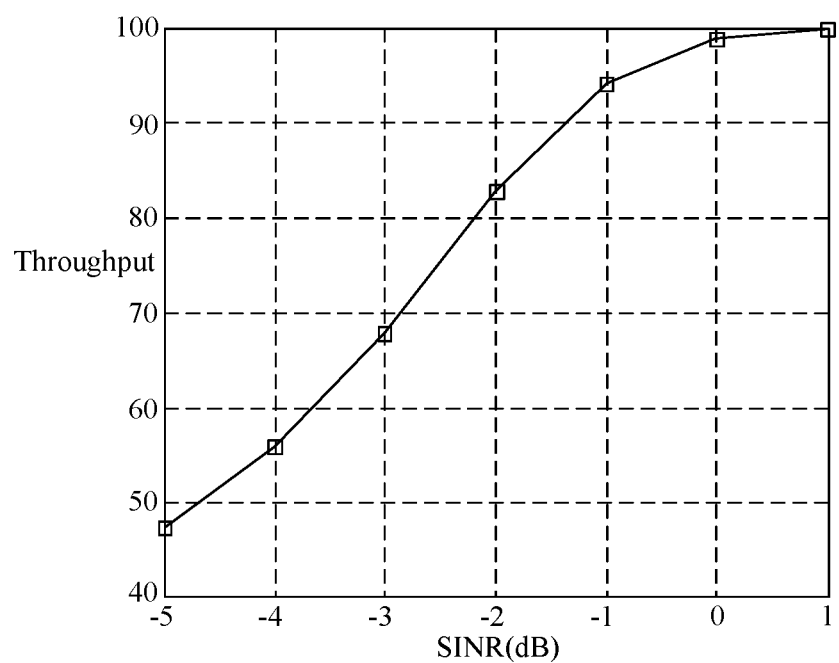
FIG. 6 is a simulation diagram of a throughput performance of a conventional MMSE-IRC receiver and a receiver according to the invention.

By comparing the conventional MMSE-IRC receiver with the receiver according to the invention in terms of throughput performance, a simulation result is as shown in FIG. 6, where " " represents the throughput performance of the conventional MMSE-IRC receiver, " " represents the throughput performance of the receiver of the disclosure, and both have the same performance.

Here, statistics are also made on the two receivers. As shown in table 1, in the conventional MMSE-IRC receiver, an $H^H R^{-1}$ operation relative to the MMSE is done for each subcarrier. In the receiver according to the invention, additional whitening operations UY and UH (i.e., left multiplication U) relative to the MMSE is done for each subcarrier, whereas the Cholescy decomposition and the upper triangular inversion are only performed once for each RB. It may be seen that for the receiver according to the invention, an extraction operation and an inversion operation for a small amount of RB levels are additionally performed, but the multiplication operations are reduced by about half as compared to those in the conventional MMSE-IRC receiver, and the overall complexity is greatly reduced.

TABLE 1

Statistics on a Computational Burden Increased in Each RB Relative to an MMSE Receiver

| | Multiplication | Addition | Inversion | Extraction |
| --- | --- | --- | --- | --- |
| MMSE-IRC | 2688 | 2304 | 2 | 0 |
| Whitening MMSE | 1229 | 917 | 4 | 4 |

If being implemented in form of a software function module and sold or used as an independent product, the IRC method supporting the transmit diversity in the embodiment of the disclosure may be stored in a computer-readable storage medium. Based on such an understanding, the technical schemes of the embodiment of the disclosure substantially or a part with contributions to the conventional art may be embodied in form of software product, and the computer software product is stored in a storage medium, including a plurality of instructions arranged to enable a computer (which may be a personal computer, a server, a network device or the like) to execute all or part of the method in each embodiment of the disclosure. The preceding storage medium includes: various media capable of storing program codes such as a U disk, a mobile hard disk, a read-only memory (ROM), a magnetic disk or a compact disc. Therefore, the embodiment of the disclosure is not limited to any specific hardware and software combination.

Correspondingly, the embodiment of the disclosure further provides a computer storage medium, in which a computer program is stored, the computer program is arranged to execute the IRC method supporting the transmit diversity in the embodiment of the disclosure, for example, the method shown in FIG. 3 and/or FIG. 4. The computer storage medium may be a storage medium such as a U disk, a mobile hard disk, a read-only memory (ROM), a magnetic disk or a compact disc, and optionally is a non-transitory storage medium.

The above are only the preferred embodiments of the disclosure, and are not intended to limit the scope of protection of the disclosure. Any modifications made according to principles of the disclosure should fall within the scope of protection of the disclosure.

The invention claimed is:

1. An interference rejection combining (IRC) method supporting transmit diversity, comprising:
   generating an N*N interference and noise covariance matrix corresponding to one subcarrier from signals, in a transmit diversity mode, received at cell reference signal (CRS) resource positions via N receiving antennas, where N is greater than or equal to 3;
   performing Cholescy decomposition and upper triangular matrix inversion on the N*N interference and noise covariance matrix to obtain an N*N block matrix;
   expanding the N*N block matrix to a 2N*2N noise whitening matrix; and
   whitening the received signals and channel estimation values according to the noise whitening matrix, and using the whitened received signals and channel estimation values to obtain a minimum mean square error-IRC (MMSE-IRC) processing result.

2. The IRC method according to claim 1, wherein said generating an N*N interference and noise covariance matrix corresponding to one subcarrier from signals, in a transmit diversity mode, received at CRS resource positions via N receiving antennas comprises:
   subtracting, from the signals, in the transmit diversity mode, received at CRS resource positions via N receiving antennas, a product of the corresponding channel estimation values and CRS symbols, and
   performing self-correlation on signals obtained by the subtracting to generate the N*N interference and noise covariance matrix corresponding to the one subcarrier.

3. The IRC method according to claim 1, wherein the Cholescy decomposition and the upper triangular matrix inversion are performed in parallel.

4. The IRC method according to claim 1, wherein said expanding the N*N block matrix to the 2N*2N noise whitening matrix comprises:
   forming the 2N*2N noise whitening matrix by using the N*N block matrix and conjugates of the N*N block matrix, wherein main diagonal elements of the formed 2N*2N noise whitening matrix are the N*N block matrix and the conjugates of the N*N block matrix, and off-diagonal elements of the formed 2N*2N noise whitening matrix are zero.

5. The IRC method according to claim 1, wherein said whitening the received signals and the channel estimation values according to the noise whitening matrix comprises:
   whitening, according to the noise whitening matrix U, the received signals into $\tilde{Y}=UY$ and the channel estimation values into $\tilde{H}=UH$, wherein the Y represents the received signals, and the H represents a matrix of the channel estimation values.

6. An interference rejection combining (IRC) device supporting transmit diversity, comprising:
   a processor; and
   a memory storing instructions executable by the processor;
   wherein the processor is arranged to:
   generate an N*N interference and noise covariance matrix corresponding to one subcarrier from signals, in a transmit diversity mode, received at cell reference signal (CRS) resource positions via N receiving antennas, where N is greater than or equal to 3;
   perform Cholescy decomposition and upper triangular matrix inversion on the N*N interference and noise covariance matrix to obtain an N*N block matrix, and expand the N*N block matrix to a 2N*2N noise whitening matrix;
   whiten the received signals and channel estimation values according to the noise whitening matrix; and
   use the whitened received signals and channel estimation values to obtain a minimum mean square error-IRC (MMSE-IRC) processing result.

7. The IRC device according to claim 6, wherein the processor is arranged to subtract, from the signals, in the transmit diversity mode, received at CRS resource positions via N receiving antennas, a product of the corresponding channel estimation values and CRS symbols, and perform self-correlation on signals obtained by the subtracting to generate the N*N interference and noise covariance matrix corresponding to the one subcarrier.

8. The IRC device according to claim 6, wherein the processor is arranged to perform the Cholescy decomposition and the upper triangular matrix inversion on the N*N interference and noise covariance matrix in parallel to obtain the N*N block matrix.

9. The IRC device according to claim 6, wherein the processor is arranged to form the 2N*2N noise whitening matrix by using the N*N block matrix and conjugates of the N*N block matrix, wherein main diagonal elements of the formed 2N*2N noise whitening matrix are the N*N block matrix and the conjugates of the N*N block matrix, and off-diagonal elements of the formed 2N*2N noise whitening matrix are zero.

10. A receiver, comprising an interference rejection combining (IRC) device supporting transmit diversity, the IRC device comprising:
    a processor; and
    a memory storing instructions executable by the processor;
    wherein the processor is arranged to:
    generate an N*N interference and noise covariance matrix corresponding to one subcarrier from signals, in a transmit diversity mode, received at cell reference signal (CRS) resource positions via N receiving antennas, where N is greater than or equal to 3;
    perform Cholescy decomposition and upper triangular matrix inversion on the N*N interference and noise covariance matrix to obtain an N*N block matrix, and expand the N*N block matrix to a 2N*2N noise whitening matrix;
    whiten the received signals and channel estimation values according to the noise whitening matrix; and
    use the whitened received signals and channel estimation values to obtain a minimum mean square error-IRC (MMSE-IRC) processing result.

11. A non-transitory computer storage medium, storing computer executable instructions, which are arranged to execute an interference rejection combining (IRC) method supporting transmit diversity, comprising:
    generating an N*N interference and noise covariance matrix corresponding to one subcarrier from signals, in a transmit diversity mode, received at cell reference signal (CRS) resource positions via N receiving antennas, where N is greater than or equal to 3;
    performing Cholescy decomposition and upper triangular matrix inversion on the N*N interference and noise covariance matrix to obtain an N*N block matrix;
    expanding the N*N block matrix to a 2N*2N noise whitening matrix; and whitening the received signals and channel estimation values according to the noise whitening matrix, and using the whitened received signals and channel estimation values to obtain a minimum mean square error-IRC (MMSE-IRC) processing result.

12. The receiver according to claim 10, wherein the processor is arranged to subtract, from the signals, in the transmit diversity mode, received at CRS resource positions via N receiving antennas, a product of the corresponding channel estimation values and CRS symbols, and perform self-correlation on signals obtained by the subtracting to generate the N*N interference and noise covariance matrix corresponding to the one subcarrier.

13. The receiver according to claim 10, wherein the processor is arranged to perform the Cholescy decomposition and the upper triangular matrix inversion on the N*N interference and noise covariance matrix in parallel to obtain the N*N block matrix.

14. The receiver according to claim 10, wherein the processor is arranged to form the 2N*2N noise whitening matrix by using the N*N block matrix and conjugates of the N*N block matrix, wherein main diagonal elements of the formed 2N*2N noise whitening matrix are the N*N block matrix and the conjugates of the N*N block matrix, and off-diagonal elements of the formed 2N*2N noise whitening matrix are zero.

15. The non-transitory computer storage medium according to claim 11, wherein said generating an N*N interference and noise covariance matrix corresponding to one subcarrier from signals, in a transmit diversity mode, received at CRS resource positions via N receiving antennas comprises:

subtracting, from the signals, in the transmit diversity mode, received at CRS resource positions via N receiving antennas, a product of the corresponding channel estimation values and CRS symbols, and performing self-correlation on signals obtained by the subtracting to generate the N*N interference and noise covariance matrix corresponding to the one subcarrier.

16. The non-transitory computer storage medium according to claim 11, wherein the Cholescy decomposition and the upper triangular matrix inversion are performed in parallel.

17. The non-transitory computer storage medium according to claim 11, wherein said expanding the N*N block matrix to the 2N*2N noise whitening matrix comprises:

forming the 2N*2N noise whitening matrix by using the N*N block matrix and conjugates of the N*N block matrix, wherein main diagonal elements of the formed 2N*2N noise whitening matrix are the N*N block matrix and the conjugates of the N*N block matrix, and off-diagonal elements of the formed 2N*2N noise whitening matrix are zero.

18. The non-transitory computer storage medium according to claim 11, wherein said whitening the received signals and the channel estimation values according to the noise whitening matrix comprises:

whitening, according to the noise whitening matrix U, the received signals into $\tilde{Y}=UY$ and the channel estimation values into $\tilde{H}=UH$, wherein the Y represents the received signals, and the H represents a matrix of the channel estimation values.

* * * * *